May 5, 1942.   C. OMAN   2,281,710
TELEMETERING SYSTEM
Filed Aug. 17, 1940
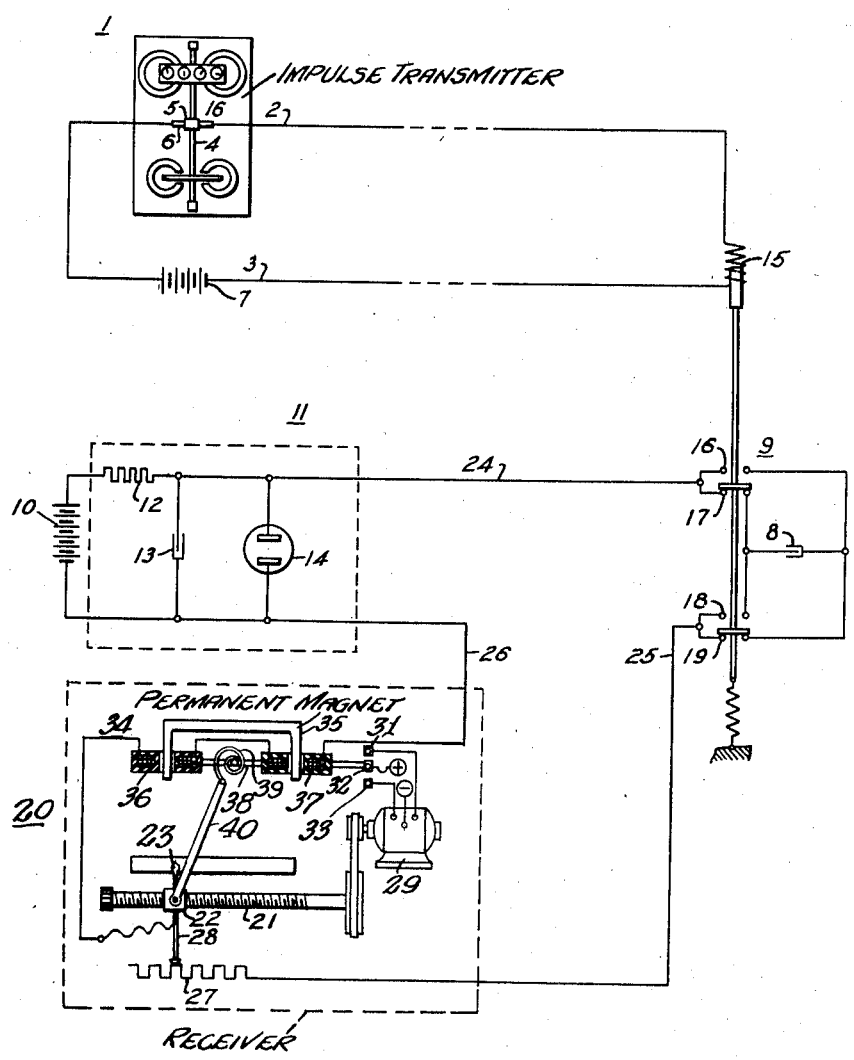
WITNESSES:
N. F. Susser.
New. C. Groome
INVENTOR
Carl Oman.
BY M. Crawford
ATTORNEY Patented May 5, 1942

2,281,710

UNITED STATES PATENT OFFICE 2,281,710

TELEMETERING SYSTEM

Carl Oman, Cedar Grove, N. J., assignor to Westinghouse Electric & Manufacturing Company, East Pittsburgh, Pa., a corporation of Pennsylvania Application August 17, 1940, Serial No. 353,022

10 Claims. (Cl. 177—351)

My invention relates, generally, to telemetering systems and, more particularly, to a telemetering system of the impulse type wherein current impulses are transmitted at varying rates dependent upon a quantity or characteristic being measured and it is an improvement on the system disclosed in my United States Letters Patent No. 2,078,680, entitled "Remote measuring system," granted on April 27, 1937.

Telemetering or remote metering systems as used heretofore wherein current impulses are transmitted to a receiver in the nature of an indicator or recorder, or both, at a rate proportional to the quantity or characteristic being measured by the transmitter or other instrument which actuates the transmitter, have required the use of considerable auxiliary equipment at the receiver to eliminate or minimize the pulsating effect of the impulses on the moving elements of the receiver especially at low rates of impulse transmission.

This is particularly true of the high-rate impulse systems wherein impulses may be transmitted at a rate of from zero to four hundred per minute. In such systems there is a considerable amount of oscillation of the receiver at the low end of the indicating scale unless the moving element or elements thereof are damped and a filter is used in the receiver circuit. Some oscillation occurs even when the receiver is damped and a filter used.

Therefore, the present invention is directed to the solution of this problem and the improvement of the operation of systems of this general nature.

The object of my invention, generally stated, is to provide a telemetering system of the current impulse type which shall be of simple construction and which shall function to provide accurate indications and/or recordings of the measured quantity or characteristic throughout the range of operation of the system.

A more specific object of my invention is to improve the operation of telemetering systems, particularly of the high-rate impulse type, to eliminate pulsations of the moving elements of the receiver at low impulse rates.

Another object of the invention is to provide for eliminating the use of damping elements in the receiver and a filter in the receiver circuit of high-rate impulse telemetering systems.

A further object of my invention is to provide for utilizing a variable resistor in the receiver circuit of a high-rate telemetering system to minimize the pulsating action of the moving elements and pointer of the receiver, particularly, at the lower end of its indicating scale or operating range.

Another object of my invention is to improve the operation of the receiver in telemetering systems, of the high-rate impulse type, utilizing a calibration condenser in the receiver circuit by connecting a variable resistor in the receiver circuit and controlling the effective resistance thereof in accordance with the rate at which the impulses are received.

These and other objects of my invention will become apparent from the following detailed description when read in conjunction with the accompanying drawing, in which the single figure is a diagrammatic view of a telemetering system embodying the principal features of my invention.

Referring to the drawing, there is shown an impulse transmitter 1 disposed to transmit current impulses at a rate dependent upon the magnitude of a quantity or characteristic to be measured over suitable channel, such as line conductors 2 and 3, to a remote receiver station. Although the transmitter 1 may be designed to indicate or measure any quantity or characteristic, I have, for purposes of illustration, shown it in the form of a watthour meter which has a moving element 4 and a commutator 5 provided with cooperating contact members or brushes 6. The brushes 6 are connected to the line conductors 2 and 3 and a source of potential, such as the battery 7, to transmit current impulses over the line conductors 2 and 3 to the receiver station at a rate dependent upon the speed of the rotating member 4 of the watthour meter 1.

At the receiving station there is provided a calibration condenser 8 which is disposed to be alternately fully charged and discharged in opposite directions by means of a reversing switch or relay 9 from any suitable source of potential, such as battery 10. A voltage regulator 11 comprising a resistor 12, condenser 13, and discharge tube 14, is provided to maintain the charging voltage of the condenser 8 at a substantially constant value so that the condenser 8 will be charged with a definite quantity of electricity for each impulse.

The reversing switch 9 is operated by its winding 15, and its contact members 16 and 17, and 18 and 19, respectively, function to alternate the polarity at which the calibration condenser 8 is charged from the battery 10.

In order to indicate or record, or both indicate and record, the measured quantity in accordance with the rate at which the impulses are received, a receiver instrument 20 is provided. The receiver may be of any suitable current responsive type and a well known type of recording instrument or meter, is diagrammatically illustrated, having a separately-driven pen mechanism 21, the traveling element 22 of which carries the pointer 23.

The pen mechanism 21 is driven by a reversible motor 29 controlled in a well known manner by contact members 31, 32 and 33 actuated by the measuring element 34 of the receiver. The measuring element 34 comprises a fixed permanent magnet 35 and a pair of movable coils 36 and 37 mounted upon the ends of a pivoted member 38 which is connected to the traveling element 22 by means of a spiral spring 39 and spring arm 40.

The receiver 20 is connected in the charging circuit of the calibration condenser 8 by means of conductors 24, 25, and 26 to be responsive to the charging currents flowing from the source 10, which always flow in the same direction through the circuit regardless of the position of the reversing switch 9.

In order to minimize the pulsations of the moving elements of the receiver 20, particularly at low impulse rates, provision is made for automatically varying the resistance of the receiver circuit in accordance with the rate at which the impulses are received. I have discovered that if the resistance of this circuit is increased as the impulse rate approaches zero, the operation of the receiver will be greatly improved and a steady indication or recording will be obtained without the use of damping means on the receiver or a filter in the receiver circuit.

While this function may be accomplished in several ways, it is believed that the use of a variable resistor controlled in accordance with the position of the traveling element 22 of the pen mechanism 21 is the preferred form of control as it is cheap, rugged, and economical to apply to existing receivers of these systems.

Accordingly, there is shown a variable resistor 27 connected in the receiver circuit and having its adjustable terminal 28 connected to the traveling element 22. It will be readily understood that when the traveling element moves to the left, as viewed in the drawing, the resistance of the receiver circuit is increased to a predetermined maximum at zero reading and is decreased to a minimum at full scale reading.

The varying resistance of the receiver circuit functions to vary the rate of charge and discharge of the calibration condenser 8. At low impulse rates where the greatest amount of pulsation and oscillation of the receiver occurs, the charging and discharging rates of the condenser are thus slowed up and smoothed out to a degree which does not interfere with the proper operation of the receiver.

It is to be understood that the control of the variable resistor 27 may be effected in other ways so long as it is done in accordance with the rate at which the impulses are received. The resistance of the receiver circuit also may be varied in other ways such, for example, as by means of an electronic tube having its plate circuit connected in the receiver circuit and its grid voltage controlled in accordance with the impulse rate.

In view of the foregoing, it will be apparent that I have provided a telemetering system having improved operating characteristics and which is of more simple construction than systems of this general nature now in use. The principles of my invention may be readily applied to existing systems to improve their operation and accuracy with a minimum of cost and effort.

While the illustrated example constitutes a practical embodiment of my invention, it will be apparent that various changes and modifications may be made therein without departing from the spirit of the invention, as defined by the appended claims.

I claim as my invention:

1. A telemetering system comprising, means for transmitting current impulses at a rate proportional to a measured quantity, a receiver disposed to be operated by said impulses and having an operating circuit energized in accordance with the rate at which the impulses are received, and means controlled in accordance with the operation of the receiver for varying the resistance of the operating circuit in accordance with the rate at which the impulses are received, said means functioning to decrease the resistance as the impulse rate increases.

2. A telemetering system comprising, means for transmitting current impulses at a rate proportional to a measured quantity, a receiver disposed to be operated by said impulses, means including a condenser responsive to the impulses received for energizing the receiver through a condenser charging circuit, and means controlled in accordance with the operating position of the receiver for varying the charging rate of the condenser thereby to minimize the oscillation of the receiver at low impulse rates, said means functioning to increase the charging rate of the condenser as the impulse rate increases.

3. An impulse measuring system comprising, means for transmitting current impulses at a rate proportional to a measurement rate, a calibration condenser, means including a charging circuit responsive to said transmitted impulses for alternately charging said condenser with opposite polarity, a measuring instrument connected to be responsive to the charging currents of said condenser, and means operable to vary the resistance of the charging circuit of the condenser from a maximum to a minimum value in accordance with the variation in the rate at which the impulses are received from minimum to maximum values.

4. A measuring system of the current impulse type comprising, means for transmitting current impulses at a rate dependent upon a measured quantity or characteristic, means including an electrical receiver responsive to said transmitted impulses, said receiver having a single operating circuit, and means controlled in accordance with the operation of the receiver for varying the resistance of the single operating circuit of said receiver in accordance with the rate at which the impulses are received, said means functioning to increase said resistance as the impulse rate decreases.

5. An impulse measuring system comprising, means for transmitting current impulses in accordance with a quantity or characteristic being measured, a calibration condenser, a charging circuit for said condenser, means responsive to the impulses for alternately charging said condenser with opposite polarity from the charging circuit, an electrical measuring instrument connected in the charging circuit, and means controlled by the measuring instrument for varying the resistance of the charging circuit inversely with respect to the impulse rate.

6. A telemetering system of the impulse type comprising, an impulse transmitter at the transmitting station operable to transmit impulses at different rates, reversing switch means at a receiving station actuated in accordance with the rate at which the impulses are transmitted, a source of constant potential, a calibration condenser disposed to be alternately charged to full capacity with current of opposite polarity from said source of potential through said reversing switch, a receiving meter connected in the charging circuit of the calibration condenser, resistor means disposed in the charging circuit of said condenser, and means actuated by said meter for varying the effective resistance of the resistor in inverse proportion to the rate of transmitted impulses.

7. A telemetering system of the impulse type comprising, transmitter means for transmitting impulses to a remote receiver station, a calibration condenser, a source of potential, reversing switch means responsive to said impulses for alternately charging the calibration condenser to opposite polarities from said source, a receiver connected in the circuit of the calibration condenser, and variable resistor means interposed in the circuit of the calibration condenser and said receiver and controlled in accordance with the operation of said receiver for varying the resistance of said circuit in accordance with the operating position of said receiver, said means functioning to increase the resistance of the said circuit as the impulse rate decreases.

8. In an impulse measuring system, in combination, an impulse transmitter, a calibration condenser, a source of potential, means for alternately charging said calibration condenser to opposite polarities from said potential source in accordance with the impulses received from said transmitter, a recorder having a movable mechanism, and circuit means connecting the recorder to the calibration condenser and said source of potential including variable resistor means actuated by said movable mechanism to automatically vary the resistance of the said circuit means from maximum to minimum value in accordance with the movement of the movable mechanism from minimum to maximum recording or indicating position.

9. An impulse measuring system comprising, an impulse transmitter for transmitting current impulses at a rate proportional to a quantity or condition affecting the transmitter, reversing switch means responsive to said impulses, a source of constant potential, a calibration condenser connected to the source of potential through said reversing switch means whereby the operation of said reversing switch means alternately charges the calibration condenser to opposite polarities, a receiver connected in series circuit relation with the calibration condenser, and a variable resistor connected in series circuit relation with the receiver and calibration condenser and actuated by the receiver to vary the resistance of the receiver circuit inversely with respect to the rate at which said impulses are received thereby to reduce the pulsations of the receiver particularly at low impulse rates.

10. In a telemetering system of the type wherein current impulses are transmitted at a rate dependent upon a measured quantity over a relatively wide range of impulses per minute, in combination, a calibration condenser, relay means responsive to said impulses for alternately charging said condenser with opposite polarity over a charging circuit from a separate current source of substantially constant voltage, a receiver having a movable mechanism and current responsive element connected in the charging circuit to be responsive to the charging currents, a variable resistor connected in series with the current responsive element, and means actuated by the movable mechanism for varying the resistor in inverse relation to the impulse rate.

CARL OMAN.